United States Patent
Calvano et al.

(10) Patent No.: US 11,879,727 B2
(45) Date of Patent: Jan. 23, 2024

(54) FLEXIBLE GAUGE CELL

(71) Applicant: Ford Global Technologies, LLC, Dearborn, MI (US)

(72) Inventors: Robert Calvano, Huntington Woods, MI (US); Nicholas Zieske, Commerce Township, MI (US); Terry Hochthanner, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 822 days.

(21) Appl. No.: 17/001,075

(22) Filed: Aug. 24, 2020

(65) Prior Publication Data

US 2022/0057188 A1    Feb. 24, 2022

(51) Int. Cl.
  *G01B 7/13* (2006.01)
  *G01B 7/004* (2006.01)
  *G01B 5/08* (2006.01)

(52) U.S. Cl.
  CPC .......... *G01B 7/13* (2013.01); *G01B 5/08* (2013.01); *G01B 7/004* (2013.01)

(58) Field of Classification Search
  CPC . G01B 7/13; G01B 5/08; G01B 7/004; G01B 5/0014; G01B 21/047; G01B 21/10; G01B 5/0025; G01B 21/00
  See application file for complete search history.

(56) References Cited

U.S. PATENT DOCUMENTS

| | | | |
|---|---|---|---|
| 7,591,078 B2 | 9/2009 | Crampton | |
| 7,954,250 B2 | 6/2011 | Crampton | |
| 2005/0166413 A1* | 8/2005 | Crampton | G01B 5/008 33/503 |
| 2019/0332097 A1* | 10/2019 | Canberi | G05B 19/4182 |

FOREIGN PATENT DOCUMENTS

| | | |
|---|---|---|
| CN | 104759933 B | * 11/2017 |
| DE | 3910531 | 10/1990 |

OTHER PUBLICATIONS

English machine translation of Lin (CN 104759933 B) (Year: 2017).*
Faro Products, Portable systems for measurement and 3D documentation, product pages.

* cited by examiner

Primary Examiner — Roy Y Yi
Assistant Examiner — Geoffrey T Evans
(74) Attorney, Agent, or Firm — Burris Law, PLLC (57) ABSTRACT

A workstation for measuring dimensions includes an operator zone, a first fixture, a second fixture, a component delivery device, a gauge, and a collaborative robot. The second fixture is accessible to an operator in the operator zone. A component delivery device deposits a first component onto the first fixture. The envelope of the component delivery device is not accessible by the operator in the operator zone. The collaborative robot supports the gauge tool and has a range of motion capable of measuring the first component on the first fixture and a second component on the second fixture. A control module is in communication with the gauge and the collaborative robot and operates the collaborative robot to measure the first component on the first fixture and the second component on the second fixture.

20 Claims, 9 Drawing Sheets

FLEXIBLE GAUGE CELL

FIELD

The present disclosure relates to workstations, and more specifically to a gauge cell for measuring workpieces.

BACKGROUND

The statements in this section merely provide background information related to the present disclosure and may not constitute prior art.

During machining, manufacturing, or assembly of components, such as automobile components for example, it can be desirable to measure the features of the components to ensure they are within tolerances. Typically, samples of the components are tested and if those samples are found to be within tolerance, then the other components produced between tested components are typically also considered to be within tolerance. If those selected components are found to be within tolerance, then the other components produced between tested components are typically also considered to be within tolerance. For some manufactured components, it may be desirable to inspect 100% of components.

In-line inspection of components are typically made with fixed inspection tooling specific to each component. Since this fixed tooling is dedicated to specific components, it is typically located in an area that is separate from humans and is not designed for interaction with humans during operation. Any design changes in the component require long lead times and high costs for reconfiguring the tooling specific to each component. If an additional component that is not in the main production stream (e.g., a prototype component or a low production-volume variant of the component) needs to be inspected, the additional component must either be manually inspected by an operator using separate gauges or the inspection tooling for the main production stream must be used. This may require extra tooling or the interruption of the main production stream.

The present disclosure addresses these and other issues associated with inspection of components.

SUMMARY

In one form, a workstation for measuring dimensions includes an operator zone, a first fixture, a second fixture, a component delivery device, at least one gauge tool, a collaborative robot, and a control module. The first fixture is configured to support a first component. The second fixture is configured to support a second component. The second fixture is accessible to an operator located in the operator zone such that the operator can access the second component on the second fixture from the operator zone. The component delivery device is arranged to move the first component and deposit the first component onto the first fixture. No moving part of the component delivery device or the first component is accessible by the operator while the operator is located in the operator zone. The collaborative robot includes an end effector. The end effector is configured to support the at least one gauge tool. The collaborative robot has a range of motion capable of moving the at least one gauge tool to measure the first component on the first fixture and the second component on the second fixture. The control module is in communication with the at least one gauge tool and the collaborative robot and is configured to operate the collaborative robot to move the at least one gauge tool to measure the first component on the first fixture. The collaborative robot is configured to move the at least one gauge tool to measure the second component on the second fixture. According to a variety of alternate forms: the at least one gauge tool includes a first gauge tool, the first gauge tool including a first detector and a second detector, wherein the first and second detectors are configured to take measurements at different locations simultaneously; the first gauge tool further includes a third detector and a fourth detector, the first, second, third, and fourth detectors being disposed about a gauge axis and equally spaced about the gauge axis; the at least one gauge tool includes a plurality of gauge tools and the workstation further includes at least one gauge storage support configured to support each gauge tool when the gauge tool is not supported by the end effector; the at least one gauge storage support is accessible by the operator when the operator is located in the operator zone; each gauge tool of the plurality of gauge tools includes a power storage unit and a wireless communication module in wireless communication with the control module; the workstation further includes at least one charging base, the at least one charging base being configured to charge the power storage units of the plurality of gauge tools when the gauge tools are supported by the at least one gauge storage support; the end effector includes a charging base configured to charge the power storage units of the plurality of gauge tools; the component delivery device is an automated delivery device; the workstation further includes a barrier between the first component on the first fixture and the operator zone; the control module is configured to operate the collaborative robot to move a first gauge tool of the at least one gauge tool that is supported by the end effector through a test motion at a plurality of discrete locations within a target region, wherein the target region is a predetermined range of possible locations for a feature on a component being tested, wherein the component being tested is either the first component or the second component; the control module is configured to output a reject condition associated with the component being tested if the first gauge tool is unable to locate the feature at any of the discrete locations within the target region; the control module is configured such that if the first gauge tool locates the feature at one of the discrete locations within the target region but the first gauge tool measures at least one dimension of the feature to be outside of a tolerance limit, then the control module operates the collaborative robot to move the first gauge tool to repeat the test motion at the discrete location where the feature was previously located and then output either: a pass condition associated with the component being tested if all dimensions of the feature measured are within the tolerance limit, or a reject condition associated with the component being tested if one or more dimensions of the feature are measured to be outside of the tolerance limit; the workstation further includes a second collaborative robot, the second collaborative robot including a second end effector, wherein the second end effector is configured to support the at least one gauge tool, the second collaborative robot being configured to move the at least one gauge tool to measure dimensions of the first component mounted on the first fixture and to measure dimensions of the second component mounted on the second fixture; the workstation further includes a passive vibration damping system disposed between a ground surface and the first and second fixtures.

According to another form, a workstation for measuring dimensions includes a first test zone, an operator zone, a second test zone, a first fixture, a second fixture, a component delivery device, a plurality of gauge tools, a collaborative robot, and a control module. The second test zone is between the first test zone and the operator zone. The first fixture is configured to support a first component within the first test zone such that the first component is not accessible to the operator from the operator zone. The second fixture is configured to support a second component within the second test zone. The second fixture is accessible to an operator located in the operator zone such that the operator can load the second component onto the second fixture from the operator zone. The component delivery device is arranged to move the first component into the first test zone and deposit the first component onto the first fixture. No moving part of the component delivery device or the first component moves through the second test zone or is accessible by the operator while the operator is located in the operator zone. The plurality of gauge tools are mounted within the second test zone and accessible to the operator while the operator is located in the operator zone. The collaborative robot includes an arm and an end effector. The end effector is configured to support each gauge tool. The arm is configured to move the end effector within the first test zone to measure the first component mounted on the first fixture with the at least one gauge tool of the plurality of gauge tools and to move the end effector within the second test zone to measure the second component mounted on the second fixture with the at least one gauge tool. The control module is in communication with the at least one gauge tool and the collaborative robot. The control module is configured to operate the collaborative robot to move the at least one gauge tool to measure the first component on the first fixture and configured to move the at least one gauge tool to measure the second component on the second fixture. According to a variety of alternate forms: the plurality of gauge tools includes a first gauge tool, the first gauge tool including a first contact detector and a second contact detector, wherein the first and second contact detectors are configured to take measurements at different locations simultaneously; each gauge tool of the plurality of gauge tools includes a power storage unit and a wireless communication module in wireless communication with the control module, and the workstation further includes at least one charging base configured to charge the power storage units, the at least one charging base being disposed on the end effector, in the second zone, or a combination thereof; the control module is configured to operate the collaborative robot to move a first gauge tool of the plurality of gauge tools through a test motion at a plurality of discrete locations within a target region, wherein the target region is a predetermined range of possible locations for a feature on a component being tested, wherein the component being tested is either the first component or the second component, and wherein the control module is configured to: output a reject condition associated with the component being tested if the first gauge tool is unable to locate the feature at any of the discrete locations within the target region, or if the first gauge tool locates the feature at one of the discrete locations within the target region but the first gauge tool measures at least one dimension of the feature to be outside of a tolerance limit, then the control module operates the collaborative robot to move the first gauge tool to repeat the test motion at the discrete location where the feature was previously located and then output either: a pass condition associated with the component being tested if all dimensions of the feature measured are within the tolerance limit, or a reject condition associated with the component being tested if one or more dimensions of the feature are measured to be outside of the tolerance limit; the first test zone is a distance from the operator zone that is greater than 1.52 meters (5 feet) from the operator zone or a barrier is disposed between the second test zone and the first test zone that inhibits an operator in the operator zone from reaching the first test zone.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1-4, a workstation 10 is illustrated along with a human operator 14. The workstation 10 includes a first fixture 18, a second fixture 22, a collaborative robot (referred to herein as the cobot 26), a control module 30, one or more gauges 34, and a delivery device 38. The workstation 10 may optionally include an enclosure 42 and/or one or more barriers 46.

Figure 3:
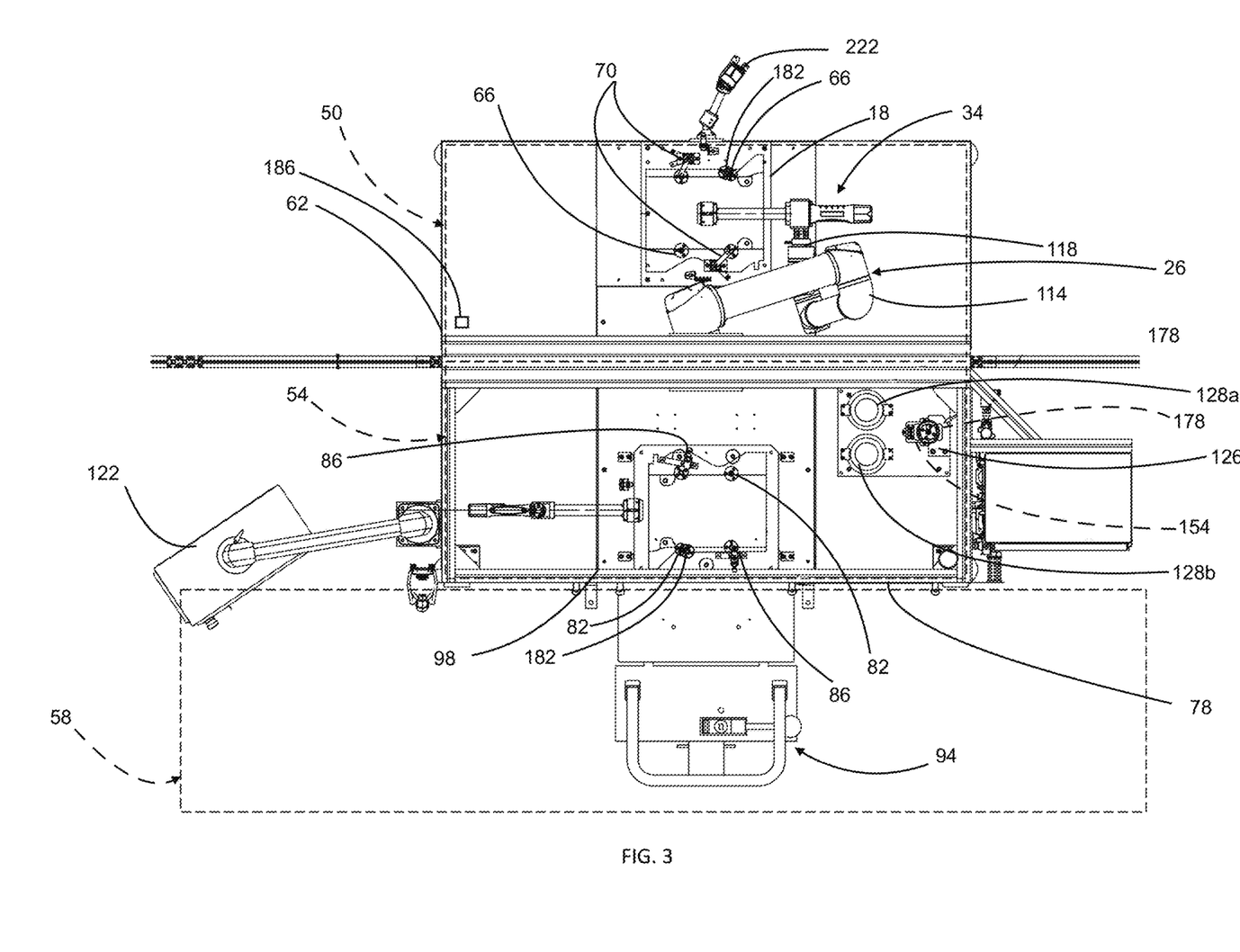
FIG. 3 is a top view of the workstation of FIG. 1.
Figure 4:
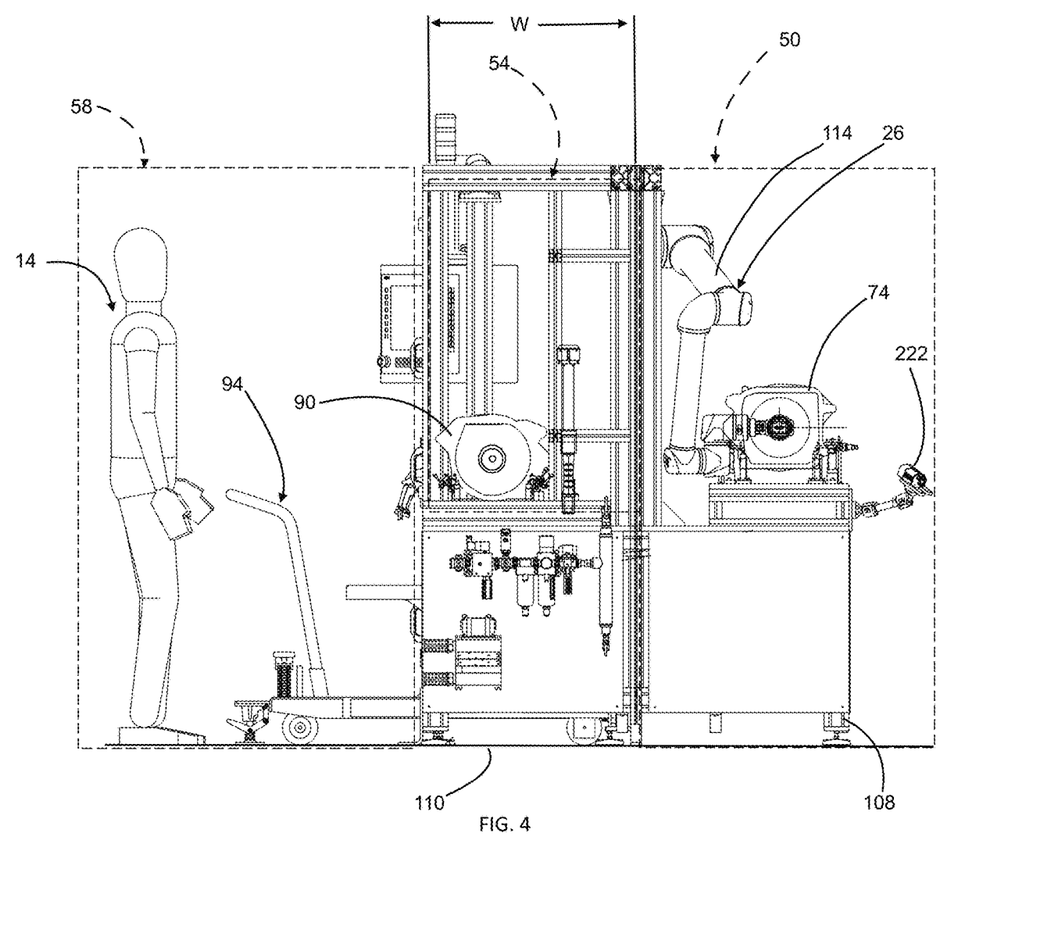
FIG. 4 is a side view of the workstation of FIG. 1.

Referring specifically to FIGS. 3 and 4, the workstation 10 (e.g., a gauge cell) includes a first zone 50, a second zone 54, and an operator zone 58. The first fixture 18 is located in the first zone 50. In the example provided, the first zone 50 is a volume of space located near a rear side 62 of the enclosure 42. The first fixture 18 includes a plurality of first supports 66 and can include a plurality of first clamps 70 or other securing devices. The first supports 66 are configured to support a first component 74 in a predetermined position within the first zone 50. The first clamps 70 are configured to clamp the first component 74 in place to inhibit its movement relative to the first supports 66. As described in greater detail below, the delivery device 38 is configured to deliver the first component 74 to the first fixture 18. The first zone 50 is also the envelope (i.e., volume of space) through which the delivery device 38 and anything attached for movement therewith (e.g., the first component 74) moves.

The second fixture 22 is located in the second zone 54. The second zone 54 is a volume of space located near a front side 78 of the enclosure 42. The second fixture 22 includes a plurality of second supports 82 and a plurality of second clamps 86 or other securing devices. The second supports 82 are configured to support a second component 90 in a predetermined position within the second zone 54. The second clamps 86 are configured to clamp the second component 90 in place to inhibit its movement relative to the second supports 82. The second component 90 may be similar to the first component 74 or may be different therefrom.

In the example provided, the second fixture 22 may be on a movable cart 94 and the enclosure 42 can include an opening 98 into which the cart 94 can be at least partially rolled to position the second fixture 22 in the enclosure 42. Thus, the second component 90 can be placed on the second fixture 22 at a different location or outside the enclosure 42 such as with a lift assist device (not shown) and then rolled into the enclosure 42. In an alternative configuration, not specifically shown, the second fixture 22 can be not on a cart and, instead, fixed within the enclosure 42 such that the second component 90 must be placed on the second fixture 22 within the enclosure 42.

Returning to the example provided, the first and second fixtures 18, 22 are passively vibration isolated from the floor 110. In one configuration, dampers 108 (e.g., magnetic dampers or rubber bushings) support the first and second fixtures 18, 22 relative to the enclosure 42. In an alternative configuration, the dampers (not specifically shown) are between the enclosure 42 and the floor 110, such as being incorporated into feet 112 of the enclosure 42 for example. In this configuration, both the cobot 26 and the fixtures 18, 22 are passively vibration isolated from the floor 110.

The operator zone 58 is a location within which the operator 14 is permitted to stand or sit and is outside of the first and second zones 50, 54. In the example provided, the operator zone 58 is exterior of the enclosure 42 proximate to the front side 78 of the enclosure 42 such that the second zone 54 is between the operator zone 58 and the first zone 50. In the example provided, the second zone 54 is located within the enclosure 42. The second zone 54 is positioned such that the operator 14 can reach into the second zone 54 and manipulate objects in the second zone 54 while the operator 14 is within the operator zone 58.

The first zone 50 is adjacent to the second zone 54 but is positioned such that the operator 14 cannot reach into the first zone 50 while the operator 14 is within the operator zone 58. In other words, the second zone 54 is a width W that is greater than the maximum arm's reach of the operator 14. In the example provided, the width W is the average operator's arm length plus 0.914 meters (3 feet) such that the operator 14 is unable to reach within 0.914 meters (3 feet) of the envelope of the delivery device 38 and all parts moving therewith (e.g., the first zone 50). In one non-limiting example, the width W may be equal to or greater than approximately 1.52 meters (e.g., 5 feet), though other distances may be used. In one configuration, the operator zone 58 can be physically identified by markings (not shown) on the floor 110. In an alternative configuration, walls, partitions, or other barriers (e.g., barriers 46) can be present to physically inhibit the operator 14 from exiting the operator zone 58 other than via a desired direction or exit (not shown). Thus the walls, partitions, or other barriers (e.g., barriers 46) can maintain the first zone 50 out of reach of the operator 14.

The cobot 26 is a robotic device configured specifically to operate within range of a human operator (e.g., the operator 14), while taking into account the presence of the operator 14. For example, the cobot 26 can be configured with sensors (not specifically shown, e.g., proximity sensors, cameras, radar, infrared sensors, contact sensors, force sensors, etc.) and/or mechanisms (e.g., clutches) and/or programming (e.g., collision avoidance) that can detect the presence of the operator 14 and actively avoid motions that could harm the operator 14. For example, the cobot 26 may be configured to avoid contact with the operator 14 and/or may be configured such that the cobot 26 is unable to exert force above a predetermined threshold amount in case the cobot 26 comes into contact with the operator 14. In the example provided, the cobot 26 includes a multi-axis arm 114 with an end effector 118 configured to support and move the gauges 34. The cobot 26 has a range of motion such that it can move the gauges 34 within the first zone 50 to measure the first component 74 mounted on the first fixture 18 and the second zone 54 to measure the second component 90 mounted on the second fixture 22. In the example provided, the cobot 26 is mounted to the enclosure 42 and may be mounted between the first and second zones 50, 54, though the cobot 26 may be mounted in other locations in the enclosure 42 or external of the enclosure 42.

The control module 30 is in communication with the cobot 26 to control motion of the cobot 26. The control module 30 is also in communication with the gauges 34 to receive signals therefrom. In one configuration, the control module 30 is in wireless communication (e.g., wi-fi, Bluetooth, or other wireless protocols) with the gauges 34. In an alternate configuration, the end effector 118 includes electrical contacts or connectors (not shown) that electrically connect to mating contacts or connectors (not shown) on the gauges 34 to communicate signals between the control module 30 and the gauges 34. The control module 30 may also optionally be in communication with the delivery device 38 to control the delivery device 38 and/or to send signals thereto. In the example provided, the control module 30 is also in communication with an input/output device 122 also referred to herein as a control panel 122 located exterior of the enclosure 42 and within reach of the operator 14 when in the operator zone 58. The control panel 122 can be any suitable input/output device and may include a display screen and buttons and/or a touch sensitive display.

In the example provided, there are a plurality of the gauges 34. Gauges 34 that are not supported by the end effector 118 are stored in the second zone 54. The gauges 34 stored in the second zone 54 are supported by one or more storage supports 126 (One of which is labeled in FIG. 3; also referred to herein as gauge supports). While only one storage support 126 is illustrated, more than one can be included. In the example provided, the second zone 54 also includes one or more sets of gage masters 128a and 128b. The gauge masters 128a, 128b are constructed to correspond to a feature 166 of the components 74, 90 being measured at the upper and lower dimensional tolerances thereof. In the example provided, the feature 166 is a bore and is also referred to herein as the bore 166, though other types or shapes of features can be measured. In the example provided, the gauge master 128a is a ring having an inner diameter equal to the upper dimensional tolerance limit for the bore 166 and the gauge master 128b is a ring having an inner diameter equal to the lower dimensional tolerance limit for the bore 166. The cobot 26 and/or the operator 14 can move the gauges 34 to the gauge masters 128a, 128b to verify that the gauges 34 are calibrated correctly. In one example configuration, the control module 30 can be configured to alert the operator 14 or to operate the cobot 26 to recheck the gauges 34 against the gauge masters 128a, 128b after a predetermined time period (e.g., after 8 hours or at the beginning of a new manufacturing shift).

Figure 5:
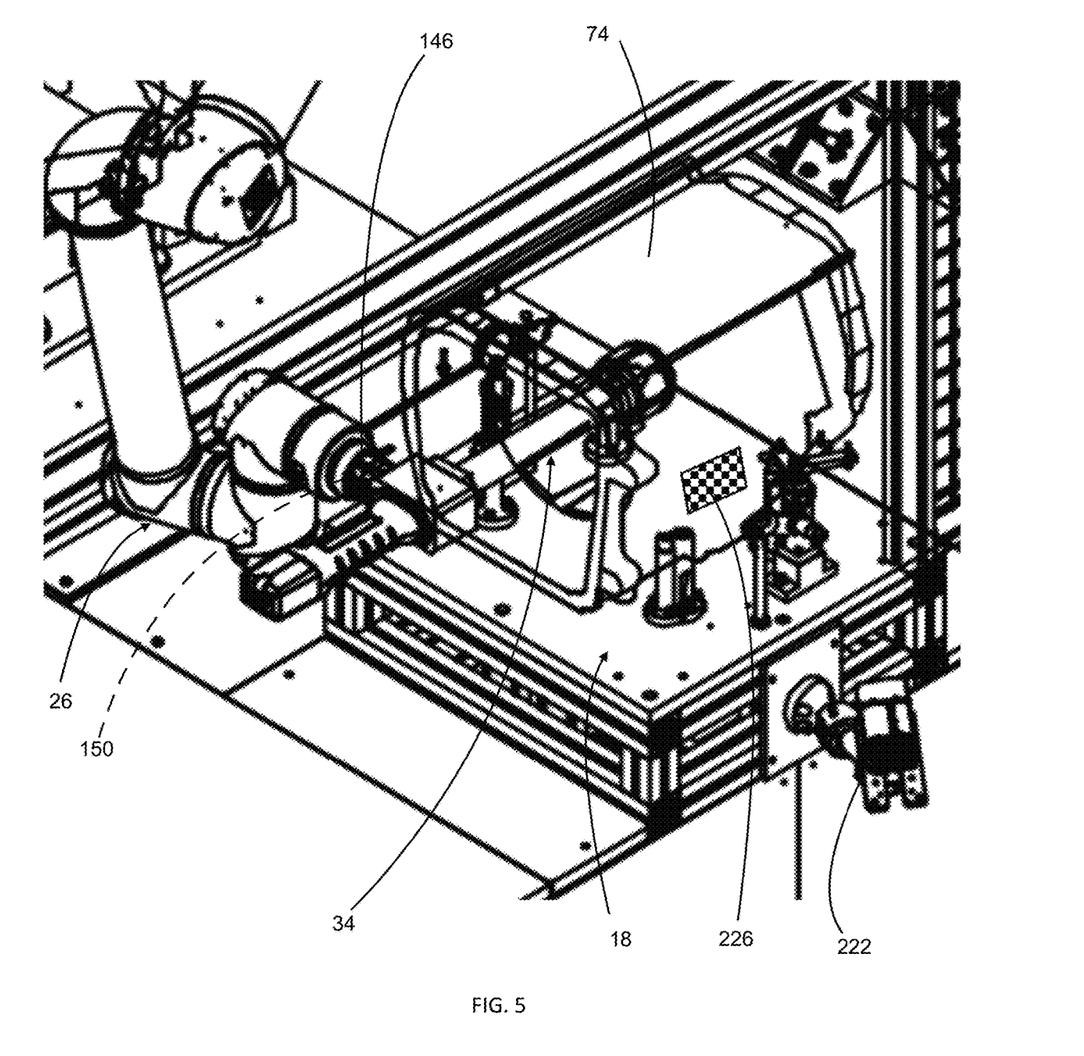
FIG. 5 is a perspective view of a portion of the workstation of FIG. 1, illustrating a collaborative robot of the workstation, an example part supported by the workstation, and a gauge supported by the collaborative robot in accordance with the teachings of the present disclosure.
Figure 7:
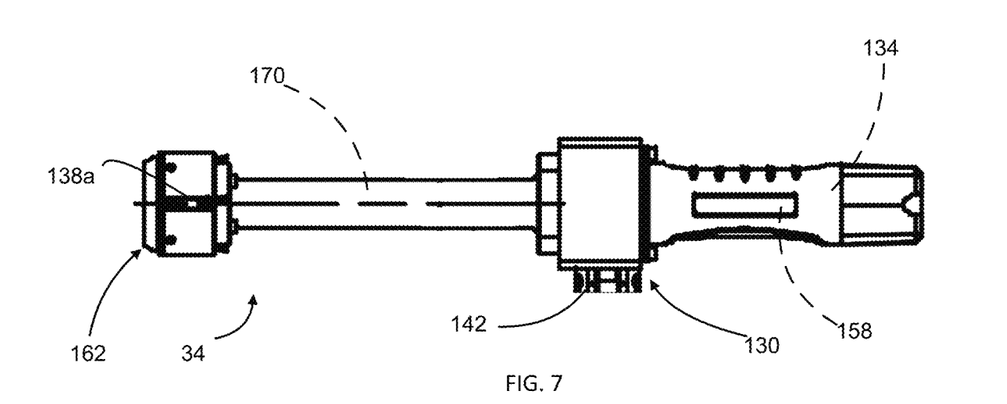
FIG. 7 is a side view of the gauge of FIG. 4.
Figure 8:
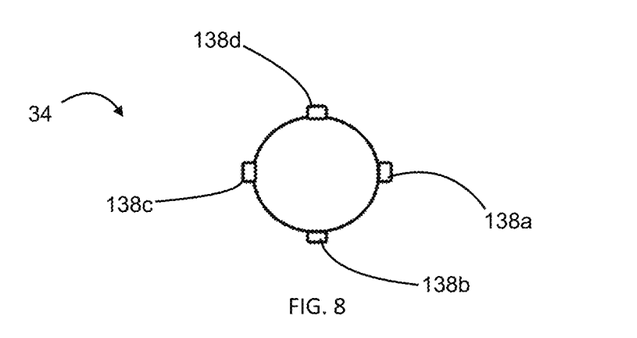
FIG. 8 is a top view of a portion of the gauge of FIG. 4.

Referring to FIGS. 7 and 8, each of the gauges 34 is an electronic device that includes a mounting region 130 configured to be releasably coupled to the end effector 118 (as best shown in FIG. 5), a power storage device 134 (e.g., a rechargeable battery) and at least one feature operable as a detector. In the example provided, the gauge 34 includes a plurality of sensors (138a, 138b, 138c, and 138d, collectively referred to herein as the sensors 138) that operate as the detector, though other configurations or features can be used.

Figure 1:
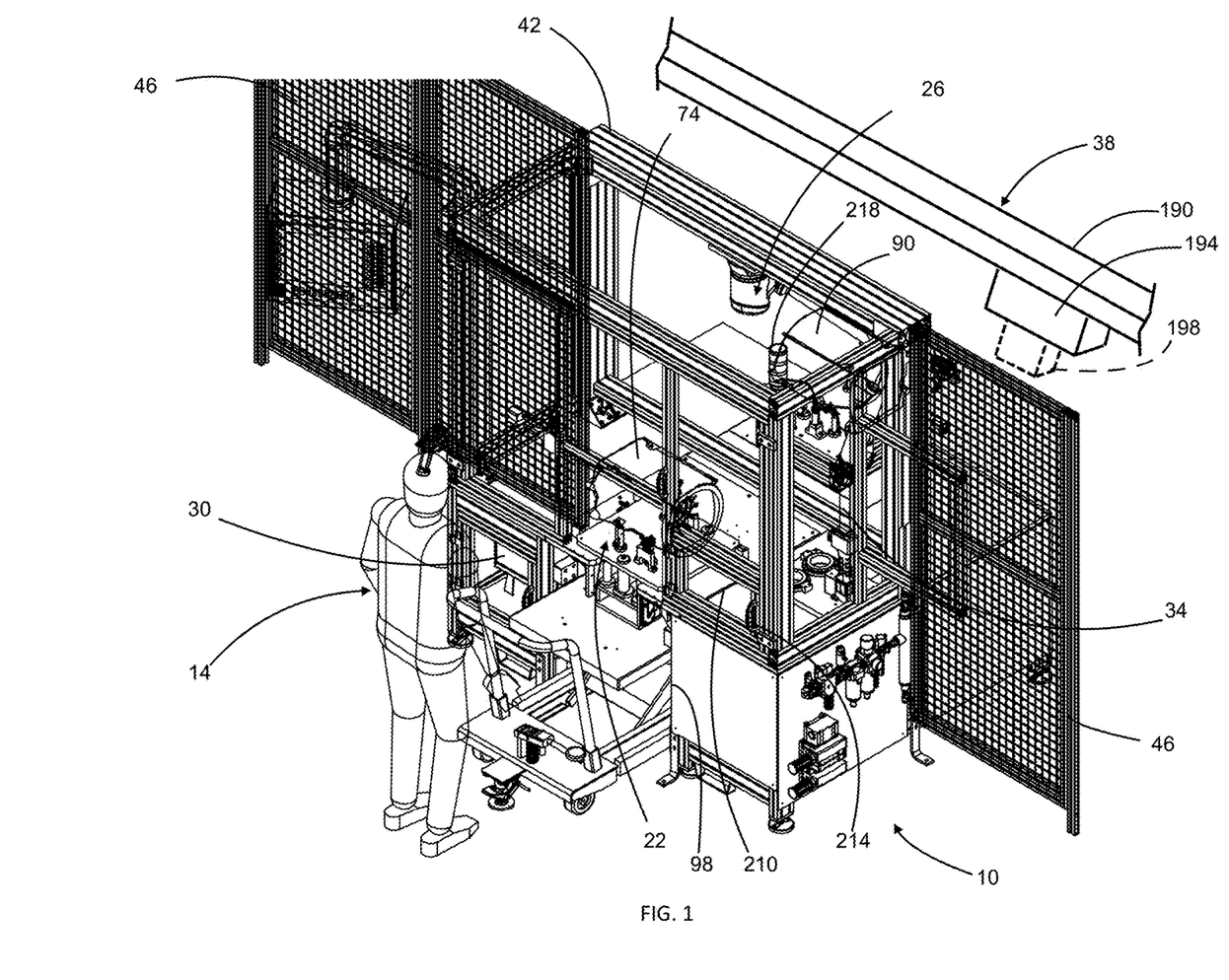
FIG. 1 is a front perspective view of a workstation in accordance with the teachings of the present disclosure.

In one example configuration, the mounting region 130 includes a mounting structure 142 configured to mate with a mating mounting structure 146 (FIG. 5) of the end effector 118. The mounting structure 142 may optionally include electrical contacts or connectors (not shown) that mate with mating electrical contacts or connectors (not shown) on the mating mounting structure 146 (FIG. 5). The electrical contacts or connectors (not shown; also referred to herein as a charging base) may also provide electrical power to charge the power storage device 134 while the gauge 34 is supported by the end effector 118 and/or may provide charging while supported by the storage support 126 (FIGS. 1 and 3). In another configuration, the power storage device 134 can be configured to wirelessly charge (e.g., via inductance charging) from a corresponding wireless charging device 150 (e.g., an inductance charging coil; also referred to herein as a charging base) located in the end effector 118 to charge the gauge 34 while in operation and/or a wireless charging device 154 (FIGS. 1 and 3; also referred to herein as a charging base) located in or proximate to the storage support 126 (FIGS. 1 and 3) to charge the gauge 34 while not in operation. In the example provided, each gauge 34 includes a wireless communication module 158 configured to send and receive wireless signals and the wireless communication module 158 is in communication with the control module 30 (FIG. 1).

Figure 6:
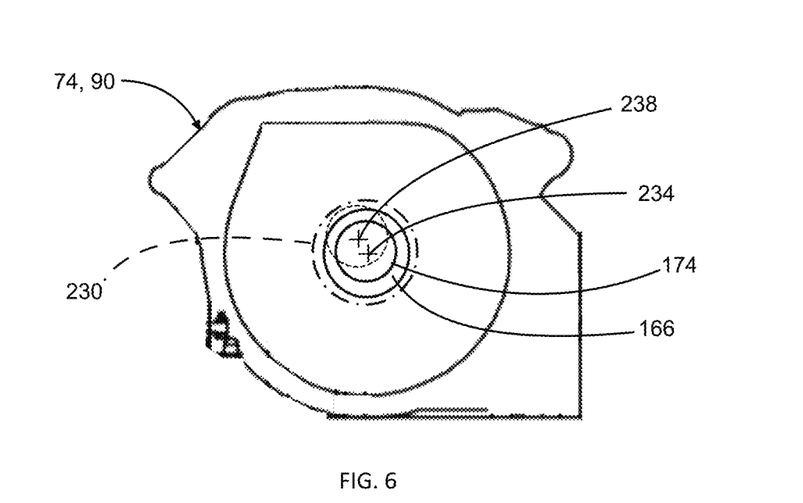
FIG. 6 is a side view of the example part illustrated in FIG. 4.

With continued reference to FIGS. 7 and 8 and additional reference to FIG. 6, the sensors 138 can be located at a distal end portion 162 of the gauge 34 and configured to measure a feature of a component 74 or 90. The example component shown in FIG. 5 can be the first component 74 or the second component 90 illustrated in FIGS. 1-4. In the example provided, the sensors 138 are configured to measure the position and size of the feature 166 of the component 74, 90. The sensors 138 can measure the position and size of the bore 166 when the distal end portion 162 of the gauge 34 is inserted into the bore 166 as shown in FIG. 5 and described in greater detail below.

In the example provided, the sensors 138 are disposed equally spaced about a gauge axis 170 such that the sensors 138a and 138b are diametrically opposite each other and the sensors 138c and 138d are diametrically opposite each other at 90° from the sensors 138a and 138b, though other configurations can be used. In an alternative configuration, not specifically shown, the gauge 34 only includes the diametrically opposed sensors 138a and 138b but does not include the sensors 138c and 138d. In another alternative configuration, not specifically shown, the gauge 34 only includes a single sensor or three sensors or more than four sensors.

The sensors 138 can be configured to engage the component 74, 90 and return signals indicative of a position and/or size of the feature 166 to be measured. In the example provided, the sensors 138 are configured to engage the inner wall 174 of the bore 166 and return signals indicative of the position of the inner wall 174 at the four locations where the sensors 138 engage the inner wall 174. In an alternative configuration, the sensors may be non-contact sensors, such as air pressure sensor(s), sonic sensor(s), Hall Effect sensor(s), optical sensor(s) (e.g., cameras, laser sensors, microwave sensors, infra-red sensors) for example. In one alternative configuration, not specifically shown, the gauge 34 can be an air gauge such that the features operating as detectors are apertures disposed about the circumference of the distal end portion 162 of the gauge 34 and pressurized air can be expelled through the apertures while one or more sensors measures the change in air pressure as the gauge 34 is inserted into the bore 166. Returning to the example provided, the sensors 138 can be configured to take independent readings simultaneously.

The control module 30 can be configured to compensate for temperature variations between subsequent components tested and between the gauge 34, the component 74, 90 and the ambient air. In the example provided, temperature sensors 178, 182, 186 are also in communication with the control module 30. Temperature sensor 178 is configured to measure the temperature of the gauge 34. Temperature sensor 182 is configured to measure the temperature of the feature 166 being measured. Temperature sensor 186 is configured to measure the temperature of the ambient air. In the example provided, the temperature sensors 178, 182, 186 are contact temperature sensors such that they must be in direct contact with the object being measured. In other words, in the example provided, remote temperature sensors (e.g., infrared temperature sensors) are not used.

In the example provided, the temperature sensor 178 (i.e., for measuring the temperature of the gauge 34) is in the storage supports 126 and the gauge temperature is read when the cobot 26 removes the gauge 34 therefrom. In one configuration, the cobot 26 can move the gauge 34 that it already is supporting over to the temperature sensor 178 to get a current temperature measurement. In an alternative configuration, the temperature sensor 178 can be mounted elsewhere in the enclosure 42 and the cobot 26 can move the gauge to it. In an alternative configuration, the temperature sensor 178 can be within the gauge 34 itself.

In one configuration, the temperature sensor 182 (i.e., for measuring the temperature of the feature 166 being measured) is configured to touch any machined surface of the component 74, 90. In an alternative configuration, the temperature sensor 182 can be configured to touch the specific machined face of the feature 166 to be measured. In the example provided, temperature sensors 182 are mounted to the corresponding first fixture 18 and the second fixture 22, though other configurations can be used. In an alternative configuration, not specifically shown, the temperature sensor 182 can be mounted to the cobot 26 and moved into contact with a machined surface of the component 74, 90. In an alternative configuration, not specifically shown, the temperature sensor 182 can be attached to the gauge 34.

The temperature sensor 186 (i.e., for measuring the ambient air) can be located in any suitable location such as being mounted to the enclosure 42 or the fixtures 18, 22 for example.

Returning to FIGS. 1 and 2, the delivery device 38 is configured to support the first component 74 and move the first component 74 into the first zone and mount the first component 74 on the first fixture 18. The delivery device 38 is further configured to unmount the first component 74 from the first fixture 18 after the first component 74 is inspected and then remove the first component 74 from the first zone 50. In the example provided, the delivery device 38 is an automated overhead gantry including a track 190, a trolley 194, and an positioning device 198, though other types of delivery devices can be used. Other non-limiting examples of automated delivery devices include automated conveyors, automated mobile robots, and automated carts. Returning to the example provided, the trolley 194 is supported by the track 190 and configured to move along the track 190.

The positioning device 198 is configured to releasably support the first component 74 to couple the first component 74 to the trolley 194 for motion along the track 190. While shown schematically as a dashed box in FIGS. 1 and 2, the positioning device 198 can be any suitable type of positioning device that can align and lower the first component 74 into position on the first fixture 18 in a controlled manner. Some non-limiting types of positioning devices may a gripper, an arm, vacuum suction port, and electromagnets.

The track 190 is positioned such that it passes over the first zone 50 and not the second zone 54 or the operator zone 58. The track 190 is also positioned such that no moving part of the delivery device 38 (e.g., the trolley 194 or the positioning device 198) or the first component 74 supported by the delivery device 38 passes through the second zone 54 or the operator zone 58. Thus, no moving part of the delivery device 38 is accessible to the operator 14 while the operator 14 is in the operator zone 58.

The enclosure 42 may optionally include transparent panels 210 (only one of which is labeled for ease of illustration) inhibiting access within the enclosure 42 while permitting viewing. In an alternative configuration, the transparent panels 210 may be replaced with a cage material (not specifically shown). One or more of the panels 210 can have a handle 214 to open as a door in order to permit the operator 14 to access the second zone 54.

As discussed above, the front side 78 of the enclosure 42 is configured so that the operator 14 can either insert the second component 90 premounted on the second fixture 22 via the cart 94, or manually mount the second component 90 on the second fixture 22. The front side 78 of the enclosure 42 is also configured so that the operator 14 can access the gauges 34 from the storage supports 126, and use the gauges 34 to manually inspect the second component 90 if desired.

The control module 30 is also programmable (e.g., via the input/output device 122) so that the cobot 26 may optionally inspect the second component 90 after it is mounted on the second fixture 22. While not shown, a dividing panel or cage wall can optionally separate the first and second zones 50, 54 while permitting the cobot 26 to move from one zone to the other (e.g., above or around the panel or cage wall. When such a dividing panel or cage wall is included, the width W of the second zone 54 may be less that the reach of the operator 14 so long as the dividing panel inhibits access to the first zone 50. The enclosure 42 may optionally include an indicator light 218 in communication with the control module 30 and configured to indicate a status (e.g., operating, error, standby, etc.) of the workstation 10.

Figure 2:
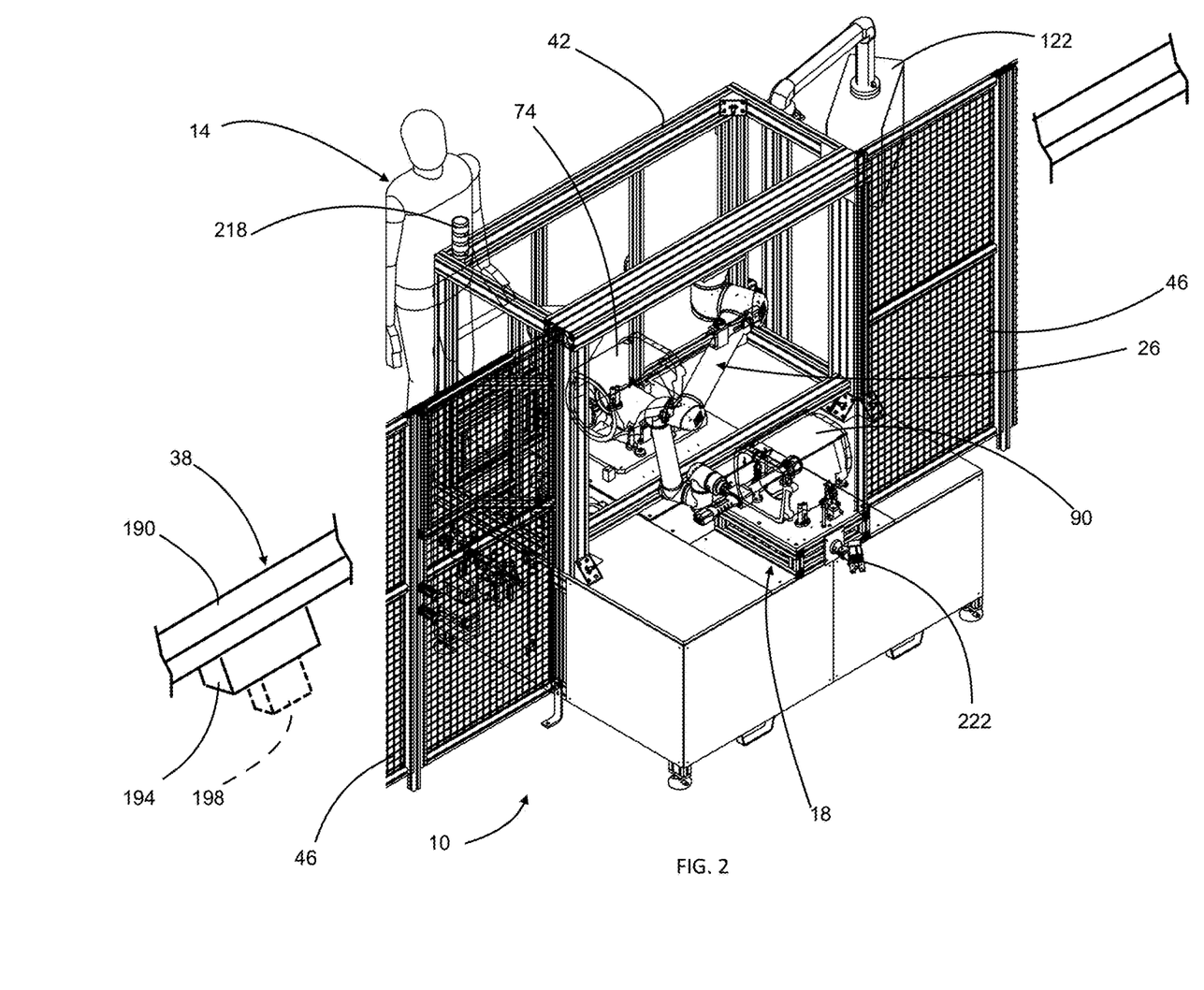
FIG. 2 is a rear perspective view of the workstation of FIG. 1.

Referring to FIG. 8 and with continued reference to FIGS. 1 and 2, a method 808 of operating the workstation 10 is illustrated. At step 810, the control module 30 can check a queue of components to be measured (e.g., in software such as a database) to determine if the next component to be measured is to be loaded from the delivery device 38 or to be loaded by the operator 14. If the next component to be measured is determined as being loaded by the delivery device 38, e.g., at step 812. Then, at step 814, the control module 30 can operate the delivery device 38 to pick up the component to be measured (e.g., the first component 74). The method can then proceed to step 816 in which the control module 30 runs a program to cause the delivery device 38 to drop off the first component to the first fixture 18.

Proceeding to step 818, the delivery device 38 can send a signal to the control module 30 indicating that the first component 74 has been released from the delivery device 38 and is positioned on the first fixture 18. The control module 30 can then send a signal to the cobot 26 to start running a measurement cycle, e.g., step 820, and may send a signal to the appropriate one or more of the gauges 34 to wake up in preparation for being used, e.g., step 822.

Proceeding to step 824, the control module 30 can operate the first clamps 70 to clamp the first component 74 onto the first fixture 18. At step 826, a sensor 222 (e.g., a camera or optical sensor in communication with the control module 30) can read an identifier 226 (FIG. 5) on the first component 74 (e.g., a bar code or 2D matrix code) that can identify the first component 74 and can correspond to the type of measurement program needed for the first component 74. Proceeding to step 828, the control module 30 can pull Quality Leadership System-Component Manufacturing ("QLS-CM") data and Quality Traceability System ("QTS") data from a database (not specifically shown) based on the identifier 226 (FIG. 5) read at step 826.

The control module 30 can then select the appropriate measurement program at step 834 for the type of component 74, 90. Proceeding to step 836, the control module 30 can then perform a check to determine if the appropriate one of the gauges 34 is attached to the end effector 118. If the appropriate gauge 34 is not attached, then the method 808 can proceed to step 838 and the control module 30 can control the cobot 26 to pick up the appropriate gauge 34 from the gauge storage supports 126. Once the appropriate gauge 34 is supported by the end effector 118, the method can proceed to step 840.

At step 840, the control module 30 can operate the cobot 26 to put the gauge 34 into position ready for measuring the feature 166. At step 842, the control module 30 can run the measurement program.

Figure 10:
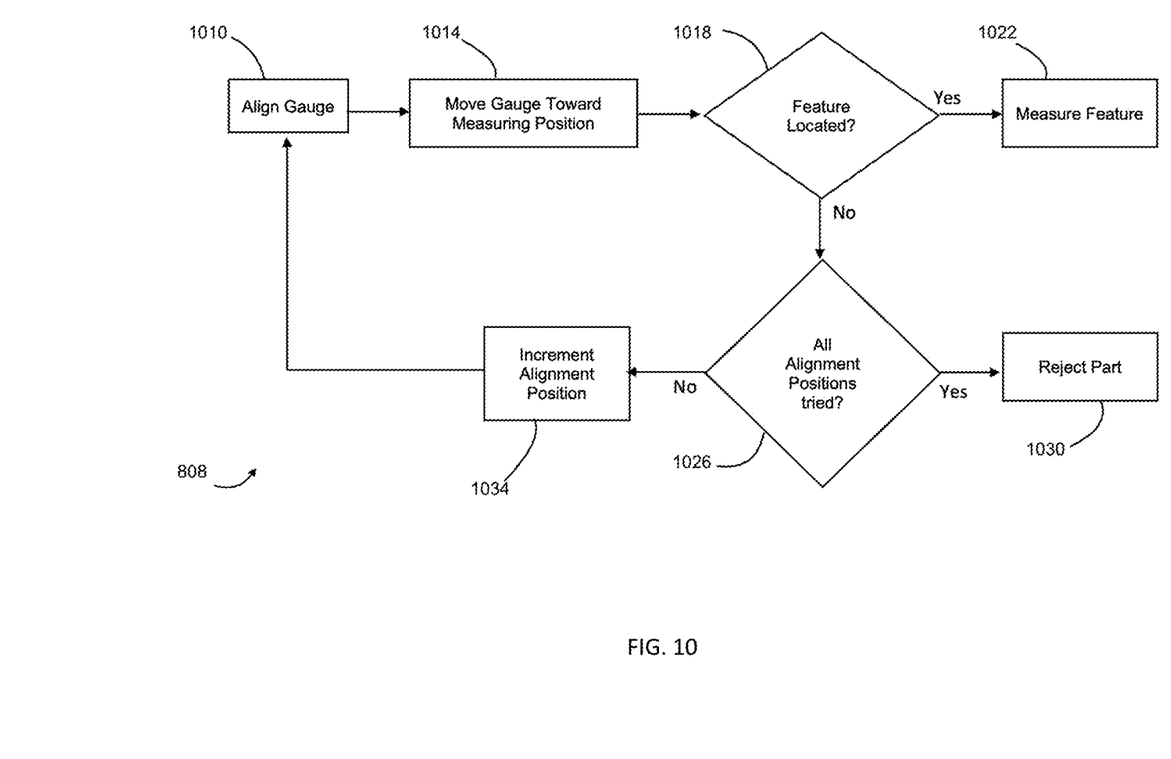
FIG. 10 is a flow chart showing additional detail of one of the steps of the method shown in FIG. 9.

Referring to FIG. 10, an example of the step 842, i.e., running the measurement program, of method 808 is illustrated in greater detail. In the example provided, the measurement program includes a target region 230 (shown in FIG. 6) in which the feature 166 being measured is expected to be within. This target region 230 can be the acceptable bounds for where the feature 166 can be located on the component 74, 90. In other words, the target region 230 can be representative of the tolerances for locating the feature 166. At step 1010, the cobot 26 aligns the gauge 34 to a first expected location 234 within the target region 230. At step 1014, the cobot 26 moves the gauge axially toward a measuring position for the feature 166 or where such a measuring position would be if the feature 166 is aligned with the first expected location 234.

Figure 9:
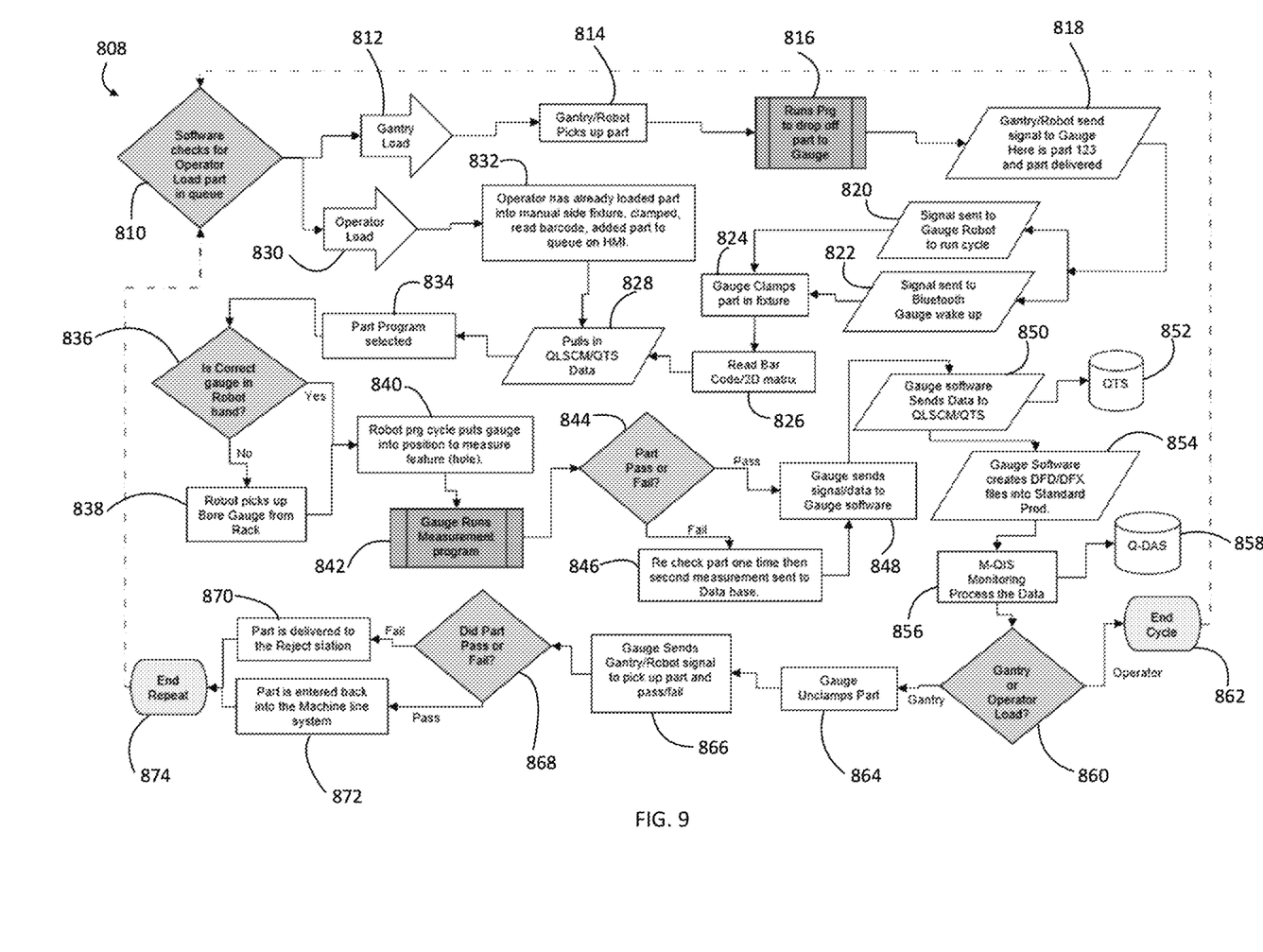
FIG. 9 is a flow chart of a method of operating the workstation of FIG. 1 in accordance with the teachings of the present disclosure.

At step 1018, if the feature 166 is aligned with the first expected location 234, or within a minor tolerances thereof, the method moves to step 1022 and measures the feature 166. After measuring the feature at step 1022, the method 808 can proceed to step 844 (FIG. 9).

Returning to step 1018, if control module 30 determines that the feature 166 is not aligned with the first expected location 234, the method 808 moves to step 1026. At step 1026, the program checks if all alignment positions of a set of discrete alignment positions within the target region 230 have been tried. If all alignment positions within the target region 230 have been tried and the feature 166 has not been located, the method 808 proceeds to step 1030 and considers the component 74, 90 to have not passed and the method 808 outputs a not-passed or reject condition and proceeds to step 860 (FIG. 9).

If all alignment positions within the target region 230 have not been tried, then the method proceeds to step 1034 and the expected location is incremented to a next possible expected location in the target region 230. The next expected location is a different location than the previously checked location(s) (e.g., the first expected location 234) but remains within the target region 230, such as location 238 shown in FIG. 6, for example. The method 808 proceeds back to step 1010 to align the gauge 34 with this next expected location 238 and proceeds again through steps 1014 to step 1018 and so on until the feature 166 is either measured or not found in the target region 230.

Returning to FIG. 8, at step 844, the control module 30 checks if the first component 74 passed or did not pass the dimensional measurement from step 1022. In other words, the control module 30 can check the detected measurements against stored expected dimension data and determine if the detected measurements are within tolerances of the expected values. If the detected measurements are within tolerances of the expected values, the test is deemed to have passed. A passed condition is output and the method 808 can proceed to step 848 where the measured values or data is sent to gauge software, e.g., running in the control module 30. However, if the detected measurements are not within tolerances of the expected values, the test is deemed to have not passed and the method 808 proceeds to step 846.

At step 846, the control module 30 operates the cobot 26 to remeasure the feature 166 of the first component 74. In this example, the first measurement values or data that did not pass are discarded and these second measurement values or data are what is sent to the gauge software at step 848. If the second measurements are within tolerances of the expected values, the test is deemed to have passed and a passed condition is output. If the second measurements are not within tolerances, the test is deemed to have not passed and a not-passed or reject condition is output.

At step 850, the gauge software may send the measurement data to a Quality Leadership System-Component Manufacturing ("QLSCM") and/or Quality and Traceability System ("QTS"). In the example provided, the control module 30 at least sends the measurement data to the QTS at step 852. In the example provided, the method proceeds to step 854 in which the gauge software creates descriptive data and value data which can be saved in a shared file or in two separate files such as a "*.DFD" file for the descriptive data and a "*.DFX" file for the value data. At step 856, the control module 30 may send the descriptive and value data to a Monitoring-Quality Information System ("M-QIS") which can process the data and send it to Qualitative Data Analysis Software ("Q-DAS") at step 858.

At step 860, the method 808 can proceed to step 864 if the component (i.e., the first component 74) was loaded by the delivery device 38. At step 864, the control module 30 can operate the first clamps 70 to unclamp the first component 74. At step 866, the control module 30 can then send a signal to the delivery device 38 to cause the delivery device 38 to pick up the first component and remove the first component 74 from the first fixture 18.

Referring to step 868, if the first component 74 did not pass, the method proceeds to step 870. At step 870, the delivery device 38 delivers the first component 74 to a part reject station (not shown) and the method 808 can end (at step 874) or return to step 810 to evaluate the next component to be measured. Returning to step 868, if the first component 74 passed, the method 808 proceeds to step 872. At step 872, the delivery device 38 delivers the first component 74 back into the machine line system (e.g., the assembly line) and the method 808 ends (at step 874) or returns to step 810 to evaluate the next component to be measured.

Returning to step 810, if the control module 30 determines that the next component to be measured is to be loaded by the operator 14 instead of by the delivery device 38, then the method 808 proceeds to step 830 wherein the operator loads the second component 90 onto the second fixture 22. The method 808 then proceeds to step 832 in which the part is positioned in the second zone 54 and an identifier (e.g., a barcode, similar to identifier 226 that shown in FIG. 5) for the second component 90 is entered. The identifier can be automatically scanned or the operator 14 can scan the identifier or enter it manually. The method 808 can then proceed directly to step 828 and proceed as otherwise described above therefrom except that at step 860 the method ends (at step 862) or returns to step 810.

Figure 11:
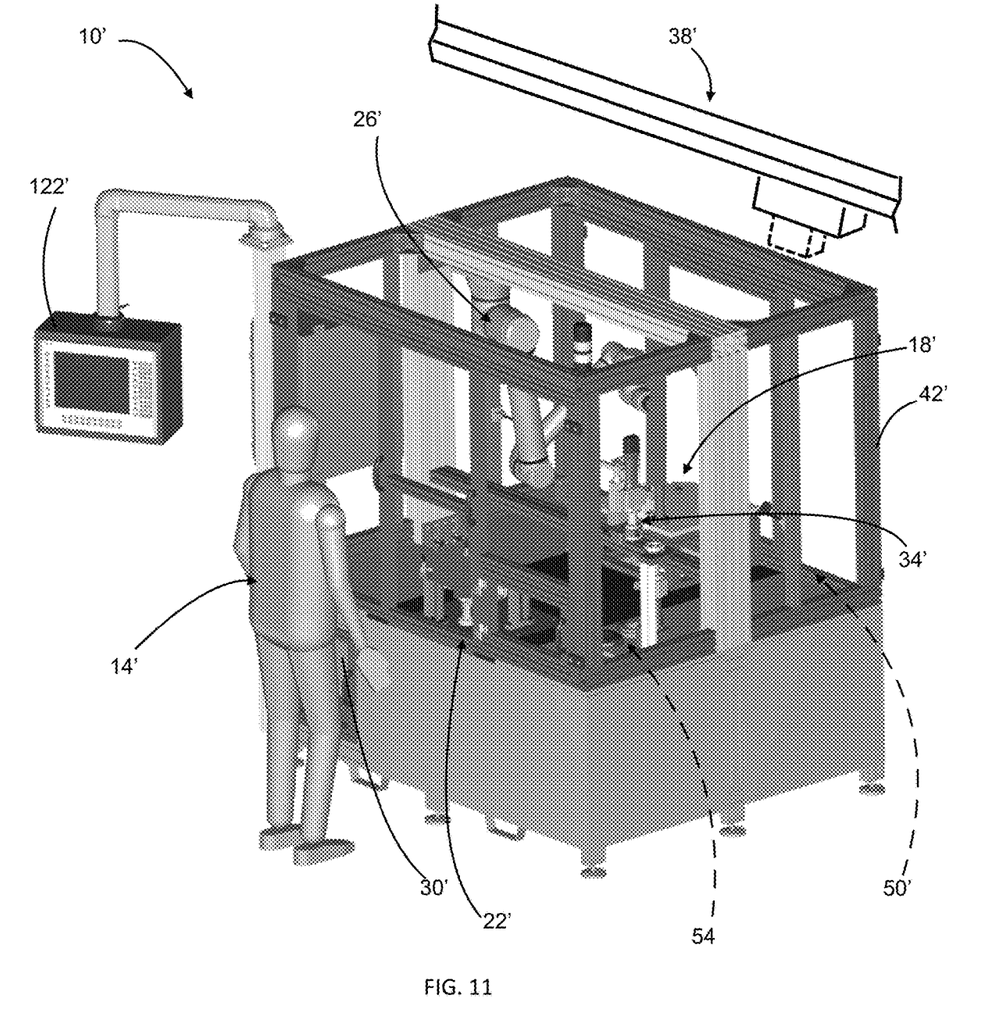
FIG. 11 is a perspective view of a workstation of a second configuration in accordance with the teachings of the present disclosure.

Referring to FIG. 11, an alternative configuration of a workstation 10' is illustrated. The workstation 10' is similar to the workstation 10 (FIGS. 1-9) and only differences are described in detail herein. Similar features are identified with similar but primed reference numerals. In the example provided, the barriers 46 (FIGS. 1-3) are not included and the enclosure 42' encloses the entire first zone 50' and the entire second zone 54'. In the example provided, the second fixture 22' is not on the cart 94 (FIGS. 1, 3, and 4) and is, instead, fixed in place within the enclosure 42'. In an alternative configuration, not specifically shown, the entire first zone 50' and the entire second zone 54' can be enclosed by the enclosure 42' and the enclosure 42' can be configured to receive the cart 94 (FIGS. 1, 3, and 4).

In an alternative configuration, not specifically shown, the enclosure 42, 42' can include one or more additional cobots similar to the cobot 26, 26'. The additional cobot(s) can perform functions in addition to the cobot 26, 26'. For example an additional cobot can measure parts loaded in the second zone 54 while the cobot 26, 26' measures parts in the first zone 50. Alternatively, the additional cobot(s) and the cobot 26, 26' can measure different features on the same component.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A workstation for measuring dimensions comprising:
an operator zone;
a first fixture configured to support a first component;
a second fixture configured to support a second component, the second fixture being accessible to an operator located in the operator zone such that the operator can access the second component on the second fixture from the operator zone;
a component delivery device arranged to move the first component and deposit the first component onto the first fixture, wherein no moving part of the component delivery device or the first component is accessible by the operator while the operator is located in the operator zone;
at least one gauge tool;
a collaborative robot including an end effector, the end effector configured to support the at least one gauge tool, the collaborative robot having a range of motion capable of moving the at least one gauge tool to measure the first component on the first fixture and the second component on the second fixture; and
a control module in communication with the at least one gauge tool and the collaborative robot and configured to operate the collaborative robot to move the at least one gauge tool to measure the first component on the first fixture and configured to move the at least one gauge tool to measure the second component on the second fixture.

2. The workstation according to claim 1, wherein the at least one gauge tool includes a first gauge tool, the first gauge tool including a first detector and a second detector, wherein the first and second detector are configured to take measurements at different locations simultaneously.

3. The workstation according to claim 2, wherein the first gauge tool further includes a third detector and a fourth detector, the first, second, third, and fourth detector being disposed about a gauge axis and equally spaced about the gauge axis.

4. The workstation according to claim 1, wherein the at least one gauge tool includes a plurality of gauge tools and the workstation further includes at least one gauge storage support configured to support each gauge tool when the gauge tool is not supported by the end effector.

5. The workstation according to claim 4, wherein the at least one gauge storage support is accessible by the operator when the operator is located in the operator zone.

6. The workstation according to claim 4, wherein each gauge tool of the plurality of gauge tools includes a power storage unit and a wireless communication module in wireless communication with the control module.

7. The workstation according to claim 6 further comprising at least one charging base, the at least one charging base being configured to charge the power storage units of the plurality of gauge tools when the gauge tools are supported by the at least one gauge storage support.

8. The workstation according to claim 6, wherein the end effector includes a charging base configured to charge the power storage units of the plurality of gauge tools.

9. The workstation according to claim 1, wherein the component delivery device is an automated delivery device.

10. The workstation according to claim 1 further comprising a barrier between the first component on the first fixture and the operator zone.

11. The workstation according to claim 1, wherein the control module is configured to operate the collaborative robot to move a first gauge tool of the at least one gauge tool that is supported by the end effector through a test motion at a plurality of discrete locations within a target region, wherein the target region is a predetermined range of possible locations for a feature on a component being tested, wherein the component being tested is either the first component or the second component.

12. The workstation according to claim 11, wherein the control module is configured to output a reject condition associated with the component being tested if the first gauge tool is unable to locate the feature at any of the discrete locations within the target region.

13. The workstation according to claim 11, wherein the control module is configured such that if the first gauge tool locates the feature at one of the discrete locations within the target region but the first gauge tool measures at least one dimension of the feature to be outside of a tolerance limit, then the control module operates the collaborative robot to move the first gauge tool to repeat the test motion at the discrete location where the feature was previously located and then output either:
  a pass condition associated with the component being tested if all dimensions of the feature measured are within the tolerance limit; or
  a reject condition associated with the component being tested if one or more dimensions of the feature are measured to be outside of the tolerance limit.

14. The workstation according to claim 1 further comprising a second collaborative robot, the second collaborative robot including a second end effector, wherein the second end effector is configured to support the at least one gauge tool, the second collaborative robot being configured to move the at least one gauge tool to measure dimensions of the first component mounted on the first fixture and to measure dimensions of the second component mounted on the second fixture.

15. The workstation according to claim 1 further comprising a passive vibration damping system disposed between a ground surface and the first and second fixtures.

16. A workstation for measuring dimensions comprising:
  a first test zone, an operator zone, and a second test zone disposed between the first test zone and the operator zone;
  a first fixture configured to support a first component within the first test zone such that the first component is not accessible to the operator from the operator zone;
  a second fixture configured to support a second component within the second test zone, the second fixture being accessible to an operator located in the operator zone such that the operator can load the second component onto the second fixture from the operator zone;
  a component delivery device arranged to move the first component into the first test zone and deposit the first component onto the first fixture, wherein no moving part of the component delivery device or the first component moves through the second test zone or is accessible by the operator while the operator is located in the operator zone;
  a plurality of gauge tools mounted within the second test zone and accessible to the operator while the operator is located in the operator zone;
  a collaborative robot including an arm and an end effector, the end effector configured to support each gauge tool, the arm configured to move the end effector within the first test zone to measure the first component mounted on the first fixture with the at least one gauge tool of the plurality of gauge tools and to move the end effector within the second test zone to measure the second component mounted on the second fixture with the at least one gauge tool; and
  a control module in communication with the at least one gauge tool and the collaborative robot and configured to operate the collaborative robot to move the at least one gauge tool to measure the first component on the first fixture and configured to move the at least one gauge tool to measure the second component on the second fixture.

17. The workstation according to claim 16, wherein the plurality of gauge tools includes a first gauge tool, the first gauge tool including a first contact detector and a second contact detector, wherein the first and second contact detectors are configured to take measurements at different locations simultaneously.

18. The workstation according to claim 16, wherein each gauge tool of the plurality of gauge tools includes a power storage unit and a wireless communication module in wireless communication with the control module, and
  wherein the workstation further includes at least one charging base configured to charge the power storage units, the at least one charging base being disposed on the end effector, in the second zone, or a combination thereof.

19. The workstation according to claim 16, wherein the control module is configured to operate the collaborative robot to move a first gauge tool of the plurality of gauge tools through a test motion at a plurality of discrete locations within a target region, wherein the target region is a predetermined range of possible locations for a feature on a component being tested, wherein the component being tested is either the first component or the second component, and wherein the control module is configured to:
  output a reject condition associated with the component being tested if the first gauge tool is unable to locate the feature at any of the discrete locations within the target region; or
  if the first gauge tool locates the feature at one of the discrete locations within the target region but the first gauge tool measures at least one dimension of the feature to be outside of a tolerance limit, then the control module operates the collaborative robot to move the first gauge tool to repeat the test motion at the discrete location where the feature was previously located and then output either:

a pass condition associated with the component being tested if all dimensions of the feature measured are within the tolerance limit; or a reject condition associated with the component being tested if one or more dimensions of the feature are measured to be outside of the tolerance limit.

20. The workstation according to claim 16 wherein the first test zone is a distance from the operator zone that is greater than 1.52 meters (5 feet) from the operator zone or a barrier is disposed between the second test zone and the first test zone that inhibits an operator in the operator zone from reaching the first test zone.

* * * * *